United States Patent Office 3,397,156
Patented Aug. 13, 1968

3,397,156
RAPID CURING EPOXY RESIN COMPOSITIONS
Romeo Lopez and James A. Clarke, Lake Jackson, Tex., assignors to The Dow Chemical Company, Midland, Mich., a corporation of Delaware
No Drawing. Filed Nov. 4, 1965, Ser. No. 506,406
10 Claims. (Cl. 260—2)

ABSTRACT OF THE DISCLOSURE

This invention relates to compositions of matter consisting of the reaction products of certain epoxy resins, a dicyandiamide curing agent and an acyl guanidine accelerator. These compositions can be rapidly cured to form materials which are particularly suited for use as metal adhesives and coatings.

---

This invention relates to an epoxy resin composition which can be cured rapidly at elevated temperature to a thermoset resin. These rapid curing resin compositions comprise an epoxy resin having dicyandiamide as a curing agent and an acyl guanidine as an accelerator.

Dicyandiamide or cyanoguanidine has been used as a latent curing agent for epoxy resins (U.S. Patent 2,637,-715). There is substantially no reaction between the curing agent and resin over long periods of time at ambient temperatures. The mixture must be heated to a temperature of about 330° F. and held at that temperature for an extended period of time to effect the cure. The rate of cure increases with temperatures up to about 410–430° F. where the cure takes only about ten minutes. The rate of cure varies depending upon the curing agent used. Amines, amides, quaternary ammonium compounds and certain substituted melamines are known to be useful as curing agents for epoxy resins. Other curing agents found to be successful are the dihydrazides and carbohydrazides. Details of the use of these latter curing agents can be found in U.S. Patents 2,847,395 and 3,014,009, respectively.

Some of the curing agents provide a rapid cure, but latent properties are not good.

We have found that the cure of epoxy resins with dicyandiamide can be significantly accelerated with certain acyl guanidines while at the same time, the resins retain their latent character at ambient temperatures. Thus, our invention enables the curing of epoxy resins with dicyandiamide as a latent curing agent with the ability to decrease the temperature at which the latent curing agent produces a cure of short duration. Alternatively, the higher cure temperature can be maintained for a lesser time.

The acyl guanidines which can be used in accordance with this invention may be represented by the following formula:

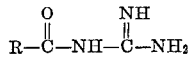

where R is hydrogen or an alkyl radical containing from one to five carbon atoms. Specific compounds having this general formula are acetyl guanidine and butyryl guanidine.

Dicyandiamide has been useful as a latent curing agent for all of the common epoxy resins. The acyl guandines, as herein defined, may be used according to this invention to accelerate the cure of any of these dicyandiamide-epoxy resin systems. Among the epoxy resins which may be cured with this combination of agents are the polyglycidyl derivatives of (1) dihydric phenols; (2) alkyl substituted dihydric phenols; (3) halogen substituted dihydric phenols; (4) bisphenols represented by the formula:

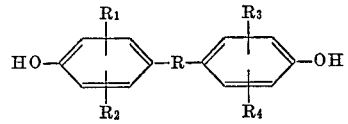

where R is selected from the group consisting of alkylene,

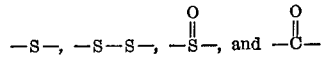

and wherein $R_1$, $R_2$, $R_3$, and $R_4$ are independently selected from the group consisting of hydrogen and halogen; (5) polyoxyalkylene glycols; and (6) the condensation products of formaldehyde and phenol, alkyl substituted phenols of halogen substituted phenols.

The temperatures at the peak exotherms of epoxy resins cured according to this invention were determined on a differential thermal analyzer in a manner similar to that described by H. C. Anderson in Analytical Chemistry 32, 12, 1592–5 (1960). The peak temperature for a given run corresponds to that at which the maximum rate of reaction is obtained. This peak temperature also is optimum oven temperature to be used for a rapid cure. Methods in which these resins can be prepared are illustrated in the following examples.

EXAMPLE I 100 parts by weight of an epoxy resin comprising a diglycidyl ether of 2,2-bis-(4-hydroxyphenyl) propane having an epoxide equivalent weight of 186–192 and a viscosity of 11,000–14,000 cps. at 77° F. was placed in a beaker. To the resin was added with stirring 7.5 parts of pulverized dicyandiamide and 0.5 part of butyryl guanidine. Also, as a suspending agent, was added five parts of a silica aerogel. The resin mixture was cured in a differential thermal analyzer heated at the rate of about 36° F. per minute and the temperature at peak exotherm was recorded as about 379° F. This sample is hereafter identified as Sample No. 1.

For purposes of comparison, a resin mixture as herein described but without an accelerator, was characterized by a temperature at peak exotherm of about 406° F. This sample is hereafter identified as Sample No. 2.

After formulating with an acrylic elastomer as a modifier and aluminum powder as a filler to produce a paste, Samples No. 1 and No. 2 above were evaluated as adhesives for metals utilizing the following general procedure. In each of a series of experiments two strips of 20 gauge steel, 12 inches in length and 1 inch wide, were sandblasted at one end, spread with adhesive and joined by forming a 1 inch by ½ inch overlap joint. Individual samples were then cured at varying temperatures after which the assembles were cooled to room temperatures and the resulting bond tested to failure using a commercial tensile test apparatus. The following Table 1 shows the cure time required, at various curing temperatures, to attain a tensile shear strength of at least 5,000 p.s.i.

TABLE 1

| Oven Temp., °F. | Sample No. 1 (0.5 part butyryl guanidine) | Sample No. 2 (No accelerator) |
|---|---|---|
|  | Minutes of Cure Time | Minutes of Cure Time |
| 400 | 15 | 20 |
| 392 | 20 | 30 |
| 360 | 30 | 60 |

The data presented in Example I illustrates the ability of butyryl guanidine to lower the temperature at which peak exotherm occurs in the curing of an epoxy resin with dicyandiamide and further illustrates (Table 1) the suitability of the formulations of the present invention as metal adhesives.

EXAMPLE II

In each of a series of experiments, several additional formulations were prepared by the procedures as set forth in Example I using acetyl guanidine or butyryl guanidine as the accelerator. The following Table 2 illustrates the tensile shear strength in p.s.i. of each of such formulations when cured for various periods at a temperature of 360° F.

TABLE 2

| This Invention Sample No.: | Accelerator | Cure time, min. | Tensile Shear Strength, p.s.i.×10³ |
|---|---|---|---|
| 3 | Acetyl guanidine | 10 | 4.55 |
| 4 | do | 20 | 5.50 |
| 5 | do | 40 | 5.81 |
| 6 | Butyryl guanidine | 10 | 2.30 |
| 7 | do | 20 | 4.45 |
| 8 | do | 40 | 5.73 |

EXAMPLE III

In each of a series of additional experiments formulations were prepared by the procedures as set forth in Example I using different accelerators. The following Table 3 illustrates the effects on the peak temperatures (that temperature at which the maximum rate of reaction is obtained).

TABLE 3

| Sample No. | Dicyandiamide (phr.) | Accelerator Amt. (phr.) | Accelerator Type | Peak Temp., ° F. |
|---|---|---|---|---|
| For comparison: | | | | |
| 9 | 7 | | | 406 |
| 10* | 6 | | | 408 |
| This invention: | | | | |
| 11 | 7 | 1 | Formyl guanidine | 378 |
| 12 | 7 | 1 | Acetyl guanidine | 389 |
| 13 | 7 | 1 | Propionyl guanidine | 389 |
| 14 | 7 | 1 | Butyryl guanidine | 399 |
| 15 | 7 | 3.5 | Formyl guanidine | 320 |
| 16 | 7 | 7 | do | 320 |
| 17 | 7 | 5 | Butyryl guanidine | 360 |
| 18* | 6 | 0.9 | Acetyl guanidine | 399 |
| 19* | 6 | 0.9 | Butyryl guanidine | 385 |

*An epoxidized phenol-formaldehyde resin having an epoxy equivalent weight of about 230.

A latent cure of these epoxy resins can be obtained with about 5–10 parts of dicyandiamide per 100 parts resin (phr.). Between about 0.1 and 7 phr. and preferably from about 0.2 and 1 phr. of the acyl guanidine accelerator can be used with these latent curing resin systems.

These resin systems may be used in any of the applications where a high temperature cure is employed. They are particularly suitable as metal adhesives, reinforced plastics, coatings, potting compounds, and the like. The resin may be applied to the substratum as a solution, then the solvent removed prior to the latent cure.

What is claimed is:

1. A thermosettable resin mixture consisting essentially of 100 parts by weight of an epoxy resin having a plurality of 1,2-epoxide groups in the molecule, from about 5 to 10 parts by weight of dicyandiamide and from about 0.1 and 7 parts by weight of an acyl guanidine having the general formula:

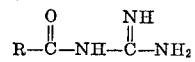

where R is selected from the group consisting of hydrogen and an alkyl radical containing from one to five carbon atoms.

2. The resin mixture of claim 1 wherein said acyl guanidine is formyl guanidine.

3. The resin mixture of claim 1 wherein said acyl guanidine is acetyl guanidine.

4. The resin mixture of claim 1 wherein said acyl guanidine is propionyl guanidine.

5. The resin mixture of claim 1 wherein said acyl guanidine is butyryl guanidine.

6. A process for preparing an epoxy resin composition which can be cured rapidly at elevated temperatures to a thermoset resin said process consisting essentially of; intimately admixing with 100 parts by weight of an epoxy resin having a plurality of 1,2-epoxide groups in the molecule with from about 5 to 10 parts by weight of dicyandiamide and from about 0.1 and 7 parts by weight of an acyl guanidine having the general formula:

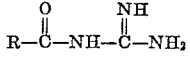

where R is selected from the group consisting of hydrogen and an alkyl radical containing from one to five carbon atoms.

7. The process of claim 6 wherein said acyl guanidine is formyl guanidine.

8. The process of claim 6 wherein said acyl guanidine is acetyl guanidine.

9. The process of claim 6 wherein said acyl guanidine is propionyl guanidine.

10. The process of claim 6 wherein said acyl guanidine is butyryl guanidine.

References Cited

UNITED STATES PATENTS 3,267,172   8/1966   Arnold _____ 260—2

WILLIAM H. SHORT, *Primary Examiner.*

T. PERTILLA, *Assistant Examiner.*